United States Patent
Bonds

(10) Patent No.: US 6,889,985 B2
(45) Date of Patent: May 10, 2005

(54) CORE METAL INSERT FOR WEATHERSEALS

(75) Inventor: Roy L. Bonds, Valley City, OH (US)

(73) Assignee: Scovil Hanna Corporation, Cleveland, OH (US)

( * ) Notice: Subject to any disclaimer, the term of this patent is extended or adjusted under 35 U.S.C. 154(b) by 83 days.

(21) Appl. No.: 10/355,875

(22) Filed: Jan. 31, 2003

(65) Prior Publication Data

US 2004/0150171 A1 Aug. 5, 2004

(51) Int. Cl.⁷ .............................. F16J 15/08; E06B 7/22
(52) U.S. Cl. .................. 277/651; 277/642; 277/921; 49/490.1; 428/573
(58) Field of Search ........................ 277/628, 637, 277/642, 651, 653, 921, 906; 49/475.1, 490.1; 428/83, 122, 358, 544, 573

(56) References Cited

U.S. PATENT DOCUMENTS

| | | | |
|---|---|---|---|
| 2,290,842 A | | 7/1942 | Bush |
| 3,241,219 A | | 3/1966 | Hamm |
| 4,074,465 A | | 2/1978 | Bright |
| 4,188,424 A | | 2/1980 | Ohno et al. |
| 4,196,546 A | | 4/1980 | Bright |
| 4,304,816 A | | 12/1981 | Bright et al. |
| 4,310,164 A | * | 1/1982 | Mesnel .................. 277/642 |
| 4,339,860 A | | 7/1982 | Hayashi |
| 4,355,448 A | | 10/1982 | Ezaki |
| 4,424,976 A | * | 1/1984 | Hayashi ................. 277/642 |
| 4,430,374 A | | 2/1984 | Ezaki |
| 4,523,448 A | | 6/1985 | Sakai et al. |
| 4,695,499 A | | 9/1987 | Whitener |
| 4,830,898 A | * | 5/1989 | Smith .................... 428/122 |
| 5,199,142 A | * | 4/1993 | Davis ....................... 29/6.1 |
| 5,249,353 A | * | 10/1993 | Kranz ..................... 428/122 |
| 5,302,466 A | * | 4/1994 | Davis et al. ............. 428/573 |
| 5,651,218 A | * | 7/1997 | Bright et al. ............ 49/490.1 |
| 5,783,312 A | | 7/1998 | Laughman et al. |
| 5,871,682 A | | 2/1999 | Kii et al. |
| 6,047,872 A | * | 4/2000 | Kii et al. ................. 225/97 |
| 6,079,160 A | | 6/2000 | Bonds |
| 6,447,928 B2 | * | 9/2002 | Suitts ..................... 428/573 |
| 6,726,978 B2 | * | 4/2004 | Sehr ....................... 277/641 |

* cited by examiner

Primary Examiner—Daniel P. Stodola
Assistant Examiner—Christopher J. Boswell
(74) Attorney, Agent, or Firm—Pearne & Gordon LLP

(57) ABSTRACT

A core metal insert is provided for reinforcing a weatherseal. The core metal insert has a generally U-channel shaped cross-section and has first and second tines extending from a longitudinally extending backbone strip. The tines are bent to provide the U-channel shaped cross-section. The backbone strip is preferably double-coined to provide first and second grooves, one along each face of the backbone strip. Double coining results in greater length extension of the core metal insert, and also provides for more reliable bending of the tines which are less prone to snap off due to bending stress. Preferably, the backbone strip is provided with a plurality of score marks on both of its opposing faces to facilitate reliable and consistent severance of the backbone strip along the score marks to provide discrete structural staples in the weatherseal.

34 Claims, 4 Drawing Sheets

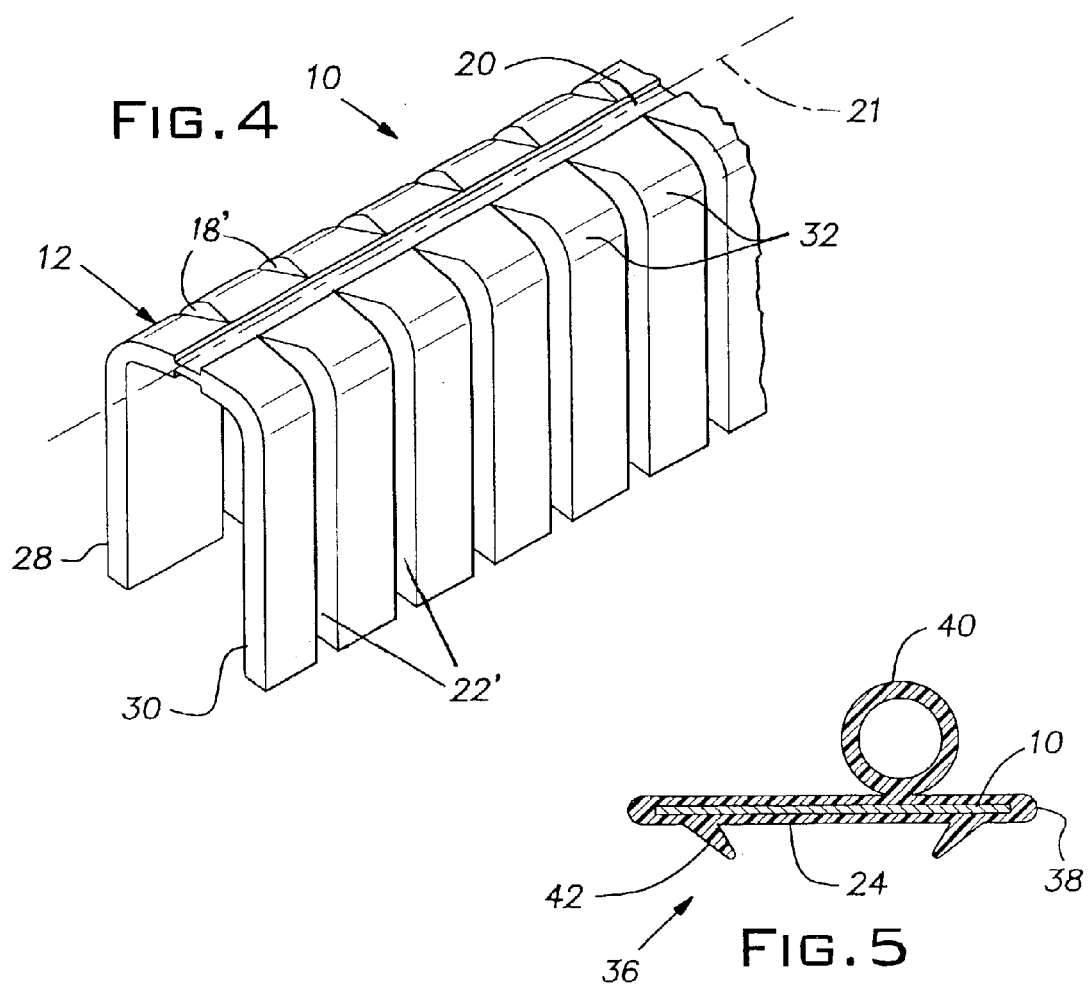
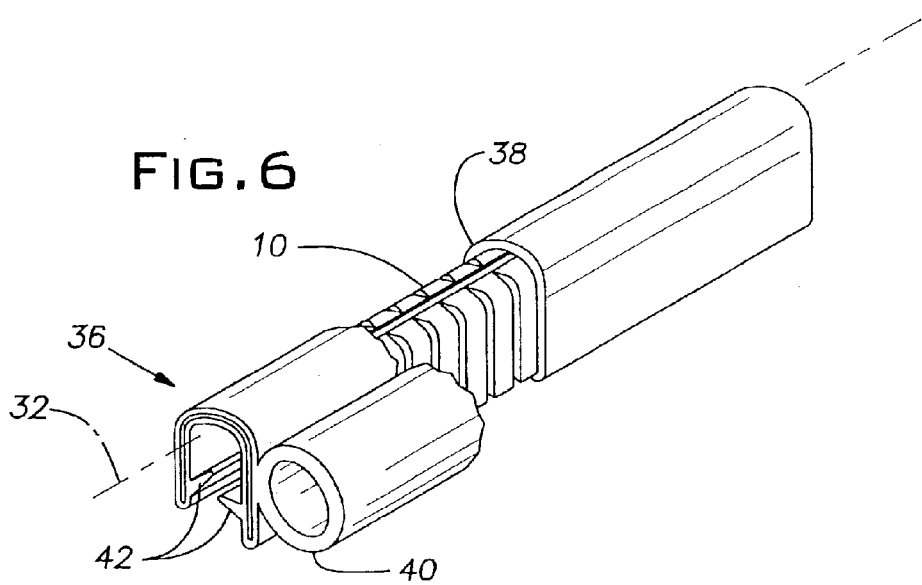

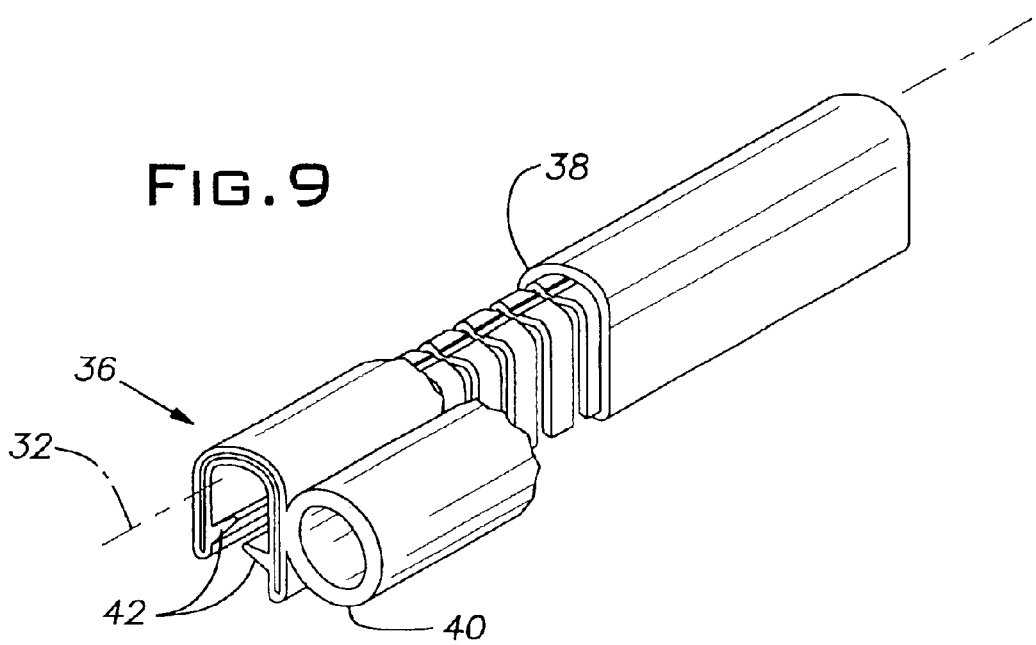
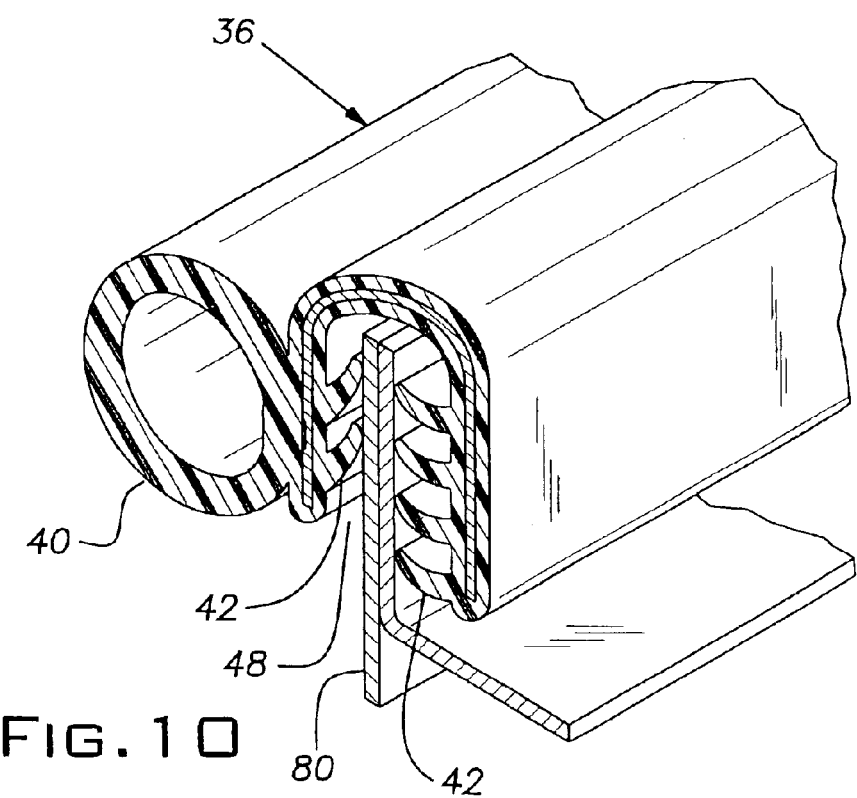

CORE METAL INSERT FOR WEATHERSEALS

BACKGROUND OF THE INVENTION

The present invention generally relates to reinforcing carriers or core metal inserts for weatherseals and, more particularly to weatherseals used on components of motor vehicles such as luggage trunks, engine compartments, doors, and windows.

Weatherseals or weatherstrips typically have a longitudinally extending channel-shaped portion for gripping flange joints such as those which extend around openings in motor vehicles. The weatherseals typically include a channel-shaped reinforcing carrier or core metal insert which is embedded within a flexible covering material such as plastic, rubber, polyurethane, or other elastomer. The carrier should be sufficiently strong to perform its desired gripping function yet sufficiently flexible to allow the weatherseal to be curved or bent to fit the contours of the flanges upon which the weatherseal is mounted.

There are many different types of core metal inserts. For example, U.S. Pat. Nos. 5,783,312, 5,871,682 and 6,079,160, each disclose a core metal insert that is continuous, i.e. is a continuous strip of metal, along the entire length of the weatherseal that it reinforces. This type of core metal insert provides adequate structural stability and rigidity to the weatherseal so that it does not lose its shape during installation or subsequent use. However, these continuous core metal inserts significantly limit the flexibility of the weatherseal in which they are embedded, often making it difficult to form the weatherseal to the highly curvilinear paths of door- and window-frames in ever-increasingly aerodynamic and modernistic automobile designs.

U.S. Pat. No. 4,695,499 discloses a core metal insert for a weatherseal that is designed to break apart into a multiplicity of largely independent core members inside the weatherseal to increase the flexibility of the strip. In this design, the core metal insert is provided with a plurality of slits leaving thin webs of metal disposed along the length of the core. According to the reference, these thin webs of metal are broken when the strip is run over a roller of suitable radius, thereby providing the multiplicity independent core members described above. However, in practice it has been found that this arrangement does not reliably result in breaking apart of all or substantially all of the individual core members. Often in practice, there may be groups of 2, 3, 4, 5, or more core members that were not separated by the above-described process.

In addition, to the above, another problem exists in prior-art core metal inserts. In order to ensure that a core metal insert will break apart into its individual members, the core metal insert is initially manufactured having as little material connecting adjacent members as possible. In one such design, the insert is manufactured as a flat metal ribbon with a continuous longitudinally-extending central strip, having laterally-extending tines attached to either side of the central strip. The tines must be bent 90° in order to provide the core metal insert in the conventional U-channel shape so that the weatherseal can be fixed to the associated door- or window-frame, or other installation. Experience has shown that a large number of the laterally-extending tines are broken off of the central strip during the bending process. The resulting weatherseal lacks structural rigidity where the tines are broken, thus largely defeating the purpose for providing the insert within the weatherseal at all.

Accordingly, there is a need in the art for an improved core metal insert for reinforcing a weatherseal which provides sufficient flexibility so that the weatherseal is easily bent without undesirable deformation of the weatherseal. Preferably, such an improved core metal insert will reliably provide separable core metal insert members wherein substantially all of the members will be separated from one another, and also wherein the laterally-extending tines do not break off upon bending to a U-channel shape.

SUMMARY OF THE INVENTION

A core metal insert for a weatherseal is provided. The insert has opposed and longitudinally extending first and second edges, a longitudinally extending backbone strip located between and spaced apart from the first and second edges, the backbone strip having a first face, a second face, a first backbone edge, and a second backbone edge, a plurality of longitudinally spaced apart first slots transversely extending from the first edge to the first backbone edge, and a plurality of longitudinally spaced apart second slots transversely extending from the second edge to the second backbone edge. The backbone strip is compressed to provide opposing first and second grooves respectively along the first and second faces of the backbone strip.

According to another embodiment, a core metal insert for a weatherseal is provided having opposed and longitudinally extending first and second edges, a longitudinally extending backbone strip located between and spaced apart from the first and second edges, the backbone strip having a first face, a second face, a first backbone edge, and a second backbone edge, a plurality of longitudinally spaced apart first slots transversely extending from the first edge to the first backbone edge, a plurality of longitudinally spaced apart second slots transversely extending from the second edge to the second backbone edge, and a plurality of score marks provided on each of the first and second faces of the backbone strip. The score marks extend transversely along the respective face of the backbone strip between associated first and second slots of the core metal insert.

A weatherseal according to the invention is also provided that has a core metal insert embedded within an outer layer of coating material. The core metal insert has opposed and longitudinally extending first and second edges, a longitudinally extending backbone strip located between and spaced apart from the first and second edges, the backbone strip having a first face, a second face, a first backbone edge, and a second backbone edge, a plurality of longitudinally spaced apart first slots transversely extending from the first edge to the first backbone edge, and a plurality of longitudinally spaced apart second slots transversely extending from the second edge to the second backbone edge. The first and second faces of the backbone strip are compressed to provide first and second grooves respectively.

A method of making a core metal insert for a weatherseal is also provided. The method includes the following steps: (a) providing a flat metal blank having a first longitudinally extending edge and a second longitudinally extending edge; (b) slitting the flat metal blank to provide a plurality of first slits extending transversely from the first edge, and a plurality of second slits extending transversely from the second edge, such that the first and second slits define a longitudinally extending unslit backbone strip located between and spaced apart from the first and second edges of the flat metal blank; and (c) double-coining the backbone strip to provide opposing first and second grooves on opposite faces of the backbone strip, wherein the backbone strip is thinned via formation of the first and second grooves. Also, the flat metal blank is stretched to form a core metal insert having pairs of associated first and second tines on opposite sides of the backbone strip.

BRIEF DESCRIPTION OF THE DRAWINGS

FIG. 3b is an end view of the core metal insert of FIG. 3a;

FIG. 4 is a perspective view the core metal insert of FIG. 3a after the tines have been bent to form a U-channel shape;

FIG. 5 is a cross-sectional view of a weatherseal including the core metal insert of FIG. 3a prior to bending to form a U-channel shape;

FIG. 6 is a perspective view of a weatherseal, partially in section, including the core metal insert of FIG. 4;

FIG. 9 is a perspective view of a weatherseal, partially in section, showing the individual structural staples therein; and FIG. 10 is a perspective view, in cross-section, of the weatherseal of FIG. 7 installed on a metal flange of a motor vehicle.

DETAILED DESCRIPTION OF PREFERRED EMBODIMENTS

Figure 1:
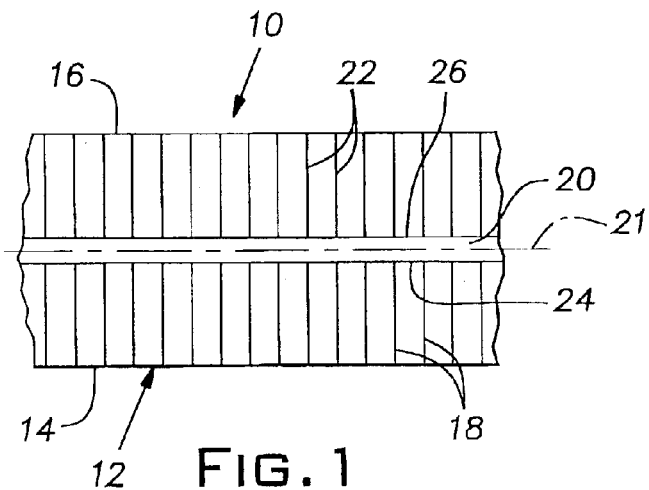
FIG. 1 is a fragmentary view of a core metal insert in blank metal form according to the present invention.

FIGS. 1 and 3 illustrate a core metal insert 10 for reinforcing a weatherseal according to the present invention. FIG. 1 illustrates a flat metal blank or strip 12 having opposed, generally parallel, and longitudinally extending first and second edges 14, 16. The metal blank 12 preferably comprises a metal such as, for example, a coated steel, an electrogalvanized steel, a mild steel, a stainless steel, or an aluminum alloy. Typically, the metal blank 12 has a thickness of about 0.016 inches to about 0.050 inches and a width of about ¾ inch to about 4 inches.

The blank 12 has a longitudinally extending backbone strip 20 located between and spaced apart from the first and second edges 14, 16. Along the first edge 14 are a plurality of longitudinally spaced-apart first slits 18 which transversely extend from the first edge 14 to the first backbone edge 24 of the backbone strip 20. The first slits 18 are preferably equally spaced apart with respect to each other. Along the second edge 16 are a plurality of longitudinally spaced-apart second slits 22, which transversely extend from the second edge 16 to the second backbone edge 26 of the backbone strip 20. The second slits 22 are preferably equally spaced apart with respect to each other. It will be understood from the foregoing, and from FIG. 1, that first and second slits 18 and 22 extend inward to define a longitudinally extending unslit region which is/becomes the backbone strip 20. Preferably, the spacing of the first slits 18 and the spacing of the second slits 22 are equal and aligned, such that each first slit 18 has an opposing or associated second slit 22 located at the same longitudinal position and substantially linearly aligned therewith, where associated first and second slits 18 and 22 are separated and made discontinuous by the backbone strip 20. The above configuration is the one illustrated in FIG. 1. Alternatively, the spacing of the first slits 18 is equal to that of the second slits 22, but the second slits 22 are longitudinally offset from the first slits 18 (not shown). In this embodiment, each first slit 18 still has an associated second slit 22, but the associated first and second slits 18 and 22 are longitudinally offset from one another.

As shown in FIG. 1, in one embodiment the backbone strip 20 is located along the centerline 21 of blank 12, i.e. spaced equally from the first and second edges 12 and 16. This placement of the backbone strip 20 provides first and second slits 18 and 22 of equal length, and will result in equal length first and second tines 28 and 30 (and a substantially U-channel shaped core metal insert 10) as further explained below. In an alternative embodiment, the backbone strip 20 may be located at a position transversely offset from the centerline 21, resulting in first slits 18 that are either longer or shorter than second slits 22. Such an arrangement will result in first tines 28 that are either longer or shorter than second tines 30 and a substantially J-channel shaped core metal insert 10. Whether a U- or J-channel shaped core metal insert is desired will depend on the particular application. As used herein and in the appended claims, the term U-channel shall be understood to embrace both U- and J-channel shaped cross-sections.

Figure 2:
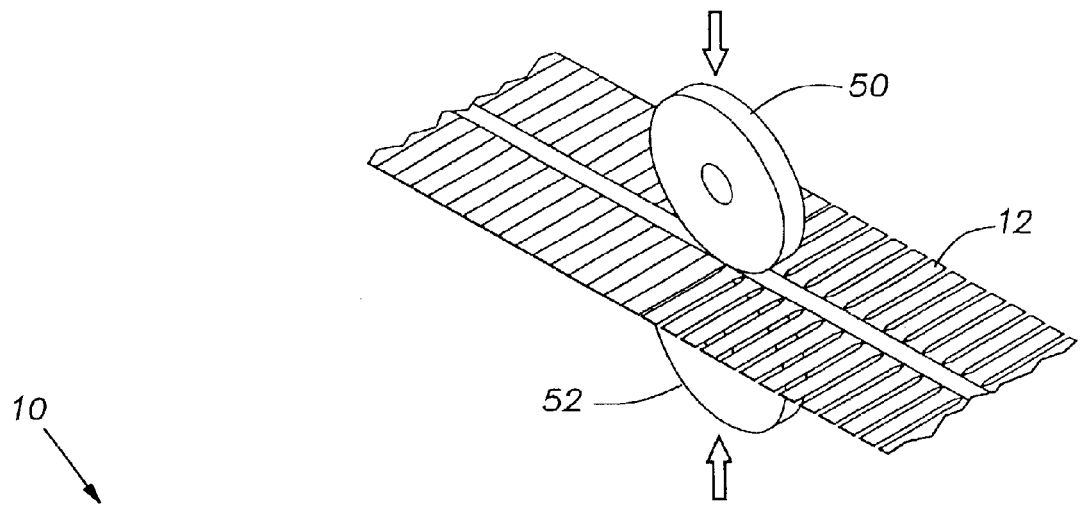
FIG. 2 is a schematic perspective view of a double coining operation according to the present invention.
Figure 3A:
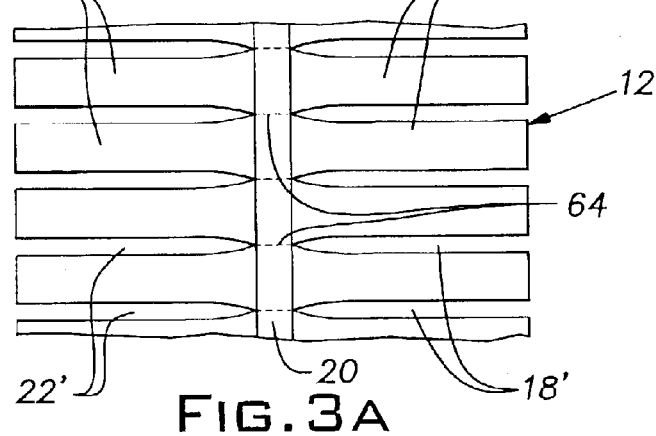
FIG. 3a is an enlarged fragmentary view of the core metal insert of FIG. 1 after it has been double-coined.
Figure 3B:
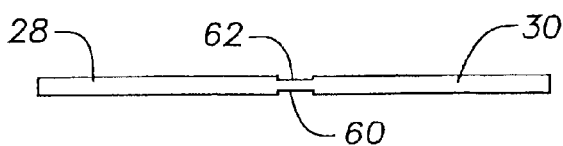

As best shown in FIG. 3a, the blank 12 is expanded by applying a force to lengthen the blank 12 and longitudinally expand or open-up the slits 18, 22 to form slots 18', 22'. Thus, opposing or associated slits 18 and 22 are expanded to form correspondingly associated slots 18' and 22'. When the associated slits 18 and 22 are linearly aligned, the correspondingly associated slots 18' and 22' will similarly be aligned with one another (as shown in FIG. 3a). Otherwise, if associated slits 18 and 22 are not linearly aligned (i.e. they are longitudinally offset from one another), then the correspondingly associated slots 18' and 22' likewise will be longitudinally offset (not shown). Longitudinal expansion of the blank is preferably achieved via a coining operation. The blank 12 is passed along a coining die that is aligned with the backbone strip 20, and the die exerts a downward force along the backbone strip 20 thus thinning the backbone strip and expanding the length of the blank 12. In a first embodiment, the coining operation can be a single coining operation as known in the art, resulting in a single-coined backbone strip 20 that has been compressed along, (resulting in a single groove adjacent), only one face of the backbone strip 20. In a second, preferred embodiment of the invention, the coining operation is a double coining operation as shown in FIG. 2, and the resulting core metal insert 10 has a double-coined backbone as shown in FIG. 3b. In this embodiment, the blank 12 is passed through the double-coining operation where opposing coining dies 50 and 52 engage opposite faces of the backbone strip 20 to impart oppositely-directed compressing forces to each of the first and second faces of the backbone strip 20 respectively. As such, the backbone strip 20 is thinned from both sides (i.e. compressed along both the first and second face thereof), resulting in first and second face depressions or grooves 60 and 62. The coining operation is preferably performed after or concomitantly with the slitting process.

The coining (or double-coining) operation results in the formation of first and second tines 28 and 30 between (and separated by) first and second slots 18' and 22' respectively. (See FIG. 3a). As seen in the figure, first and second tines 28 and 30 extend respectively from the opposing first and second backbone edges 24 and 26. In a less preferred embodiment, the blank 12 can be longitudinally expanded by applying a sufficient force thereto via other known or conventional means such as, e.g., pinch rollers to form slots 18', 22' and tines 28, 30.

Double-coining of the backbone strip 20 according to the invention is preferred because it has been found that in the resulting core metal insert 10 having opposed grooves 60 and 62, the first and second tines 28 and 30 can be bent to form a finished U-channel shaped insert 10 with no or substantially no breaking off any of the tines from the backbone strip 20; in other words, the tines 28 and 30 are substantially intact. Without wishing to be bound to a particular theory, it is believed that the double-coined backbone strip 20 with opposed grooves 60 and 62 results in a more even distribution of shear and bending stresses within the core metal insert 10 during the tine-bending process. As a result, the stresses are not focused along the apex of the bending region (shoulder 32) of the tines and therefore they are less prone to snapping off at shoulders 32 during bending.

Following the expansion of the metal blank 12, the insert 10 is provided with a plurality of score marks 64 along at least one face of the backbone strip 20 (see FIG. 3a). The score marks are provided as an intentional failure mode for snapping apart of the backbone strip 20 to provide individual insert elements or staples 70 as further described below. The score marks 64 are provided using a scoring die (not shown) or other conventional device in a conventional manner. Preferably, the depth of the score marks 64 is 8–12, preferably about 10, percent of the thickness of the starting metal blank 12 or the backbone strip 20, with the score marks 64 preferably extending transversely between associated first and second slots 18' and 22' along the face of the backbone strip 20. When associated slots 18' and 22' are longitudinally aligned, the score marks 64 therebetween are preferably orthogonal to the longitudinal axis or centerline 21 of the core metal insert 10 (as shown in FIG. 3a). Otherwise, the score marks 64 between associated slots 18' and 22' can be skew relative to the centerline 21 (not shown). As used herein and in the claims, the term "extending transversely" with respect to score marks 64 includes both orthogonal and skew orientations discussed above.

In the most preferred embodiment, the backbone strip is double-scored, meaning that score marks 64 as described above are provided on both faces of the backbone strip 20. In this embodiment, the backbone strip 20 is consistently and reliably broken or severed along the opposing score marks 64 disposed on opposite faces of the backbone strip 20 to provide individual staples 70 from the core metal insert 10 with no (or substantially no) groupings of undetached multiple staples remaining in the finished weatherseal 36 (described below).

As best shown in FIG. 4, the core metal insert 10 is preferably provided with a U-channel shaped cross-section. The first and second tines 28 and 30 are bent (e.g. substantially 90°) at shoulders 32 via conventional means to provide the U-channel shaped cross-section as shown in FIG. 4.

A core metal insert 10 according to the present invention preferably has dimensions as described in this paragraph. The following dimensions are provided with respect to the insert 10 following double-coining but prior to bending the tines 28, 30 to form the desired U-channel shaped cross-section, i.e. as shown in FIG. 3a. It will be understood that appropriate dimensions of the insert 10 will remain constant or substantially constant following bending of the tines 28, 30. Similarly, the dimensions of the discrete structural staples 70 (described below) will remain essentially constant relative to the corresponding dimensions for the insert 10 prior to severance of the backbone strip 20. All of the following dimensions are in millimeters.

The insert 10 has a width measured between the first and second edges 14 and 16 of preferably 30–40, preferably 31–36, preferably 32–35, preferably 33–34, preferably 33.7–34.

The backbone strip 20 preferably has a width of 1.5–4, preferably 1.8–3, preferably 2–2.5, preferably 2.1–2.4, and a thickness of 0.1–0.5, preferably 0.15–0.4, preferably 0.2–0.35, preferably 0.25–0.32, preferably 0.255–0.305.

First and second slots 18' and 22' preferably all have the same or substantially the same width (measured between adjacent tines at the respective edges 14 and 16), said width being preferably 0.5–1.5, preferably 0.6–1.3, preferably 0.7–1.2, preferably 0.7–1.1, preferably 0.74–1.04.

First and second 28 and 30 preferably all have the same or substantially the same dimensions, having a width (measured between adjacent slots at the respective edges 14 and 16) of 2–4, preferably 2.2–3.8, preferably 2.4–3.6, preferably 2.6–3.4, preferably 2.8–3.1, and a thickness of 0.2–0.6, preferably 0.3–0.5, preferably 0.35–0.45.

Figure 7:
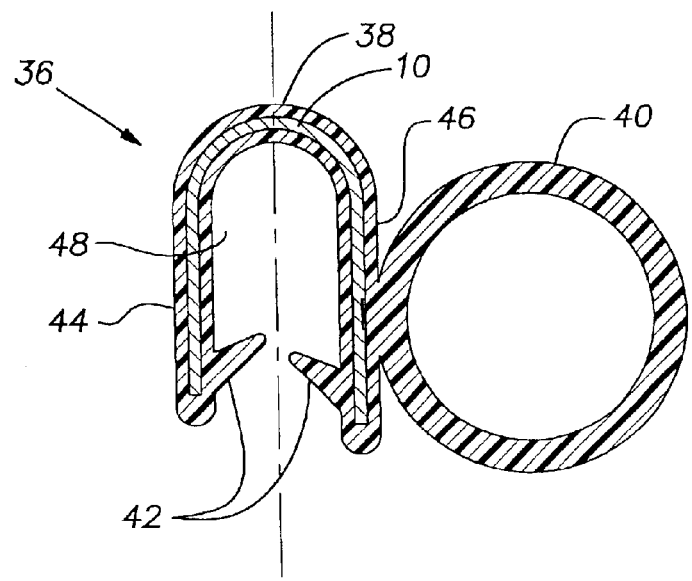
FIG. 7 is a cross-sectional view of the weatherseal of FIG. 6.

As best shown in FIGS. 5 to 7, a weatherseal 36 is preferably formed by passing the core metal insert 10 through an extruder to embed the insert within an outer layer of coating material 38. Preferably, as shown in FIG. 5 the coating material 38 is provided over the flat core metal insert 10 before bending the tines 28, 30 to form the U-channel shaped cross section. The resulting assembly is supplied to a machine or apparatus for bending the tines of the core metal insert 10 to provide a weatherseal 36 with the desired cross section (e.g. U-channel shaped as shown in FIG. 6). Alternatively, as shown in FIG. 6, the core metal insert 10 can be formed into the U-channel shape (by bending first and second tines 28 and 30) prior to feeding the core metal insert to the extruder. In this embodiment, the coating material 38 is extruded around and embeds the channel-shaped insert 10 to provide a weatherseal 36 having a longitudinal channel 48 in the desired U-channel shaped cross-section; no further bending is required. As will become apparent, it is especially beneficial to extrude the coating material 38 over the core metal insert 10 in the flat unformed shape (FIG. 5) when the core metal insert 10 is designed to be broken into a series of separate elements, such as structural staples 70, as in the present invention.

Figure 8:
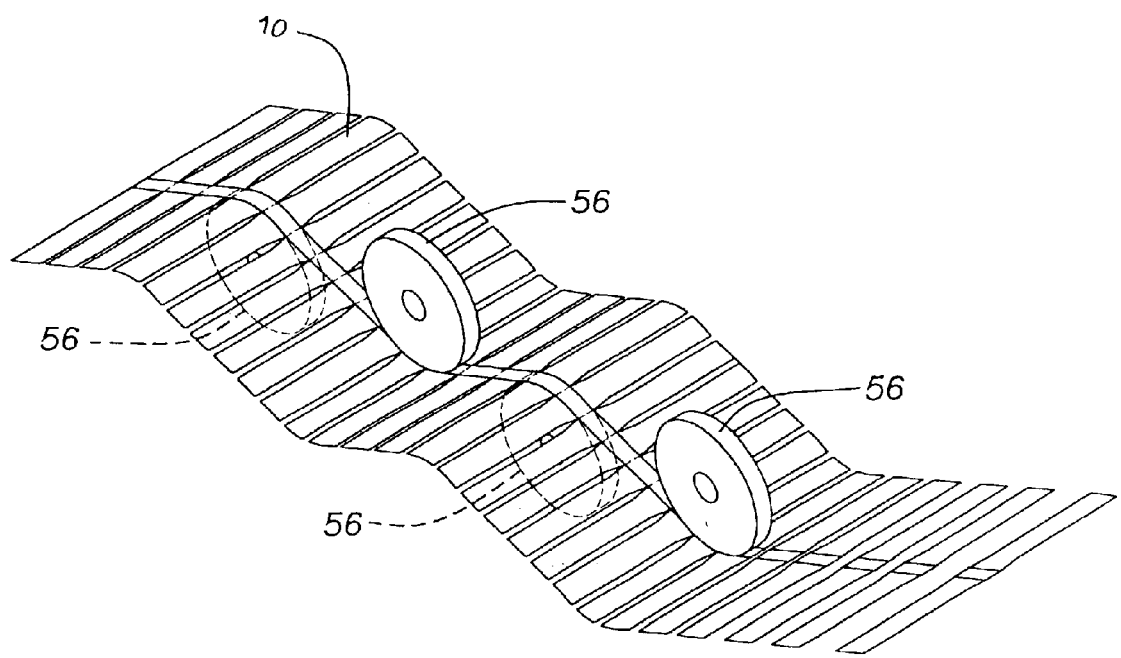
FIG. 8 is a perspective schematic view of a backbone strip severing operation according to the invention.

Referring to FIG. 8, the weatherseal 36 (with embedded core metal insert 10) is passed over a series of opposite and alternating rollers 56 to effectively sever the backbone strip 20 along the score marks 64. (For simplicity, the coating material 38 is not shown in FIG. 8). Thus, the insert 10 breaks apart (is severed) along the score marks 64 to provide individual, discrete structural staples 70 within the weatherseal 36. As each roller 56 impinges against the weatherseal 36, coating material 38 is compressed against the backbone strip 20 of the embedded insert 10, which imparts significant stresses to the backbone strip 20. These stresses are concentrated along the weakest points of the strip 20 (i.e. along score marks 64) until the strip fails (breaks) at these points. It has been found that double-scoring according to the present invention results in highly reliable and consistent breaking of the backbone strip 20 compared to only scoring one face of the backbone strip. The result is to provide the discrete structural staples 70 within the weatherseal 36 as shown in FIG. 9, with no or substantially no groupings of multiple attached staples which, up till now, has been a common problem in the art. A core metal insert 10 according to the invention preferably results in at least 90, preferably at least 92, preferably at least 94, preferably at least 96, preferably at least 98, percent of the staples 70 being completely detached from adjacent staples in the core metal insert 10 following the backbone strip severance operation discussed above. As evident from FIG. 8, the weatherseal is preferably passed over rollers 56 in a flat configuration; i.e. before bending the tines 28, 30 to a U-channel shaped configuration. However, rollers 56 can be dimensioned to fit within the channel walls 44 and 46 and ride along only the backbone strip 20 if the tines 28 and 30 are first bent to form the U-channel shaped insert 10 (and channel 48). Accordingly, the backbone severing operation depicted in FIG. 8 may proceed either before or after the tines 28 and 30 have been bent to form the U-channel shaped cross-section.

Less preferably, the backbone strip 20 can be severed along the score marks 64 by any other suitable means.

The coating material 38 is preferably a resilient and flexible material such as, for example, an elastomer, thermoplastic, natural or synthetic rubber, preferably polyvinylchloride (PVC) or polyurethane. The coating material 38 typically includes an integrally extruded or subsequently attached sealing member 40 (FIGS. 7 and 10) as known in the art such as, for example, the illustrated bulb section or a lip. The sealing member 40 is typically a high-rebounding elastomer or other suitable material. The sealing member 40 can be located at any suitable position on the weatherseal 36.

The coating material 38 also typically includes integrally extruded gripping lips 42. The gripping lips 42 longitudinally extend along the length of the weatherseal channel 48 and extend from the inner sides of opposite walls 44, 46 of the channel 48. As illustrated, there can be any number of gripping lips 42 provided and an equal or unequal number of gripping lips 42 on the opposite walls 44, 46.

As best shown in FIG. 10, when the weatherseal 36 is secured to a metal flange 80, for example around the doorframe of a motor vehicle, the discrete structural staples 70 enable the weatherseals 36 to be easily curved without deforming the sealing member 40. The present invention is particularly advantageous because the instances of multiply-grouped staples 70 (that were not successfully severed from one another) is minimized, thus providing excellent flexibility of the weatherseal 36 with little or no sealing member 40 deformation. The invention is also particularly advantageous because all or nearly all of the individual structural staples 70 remain intact, without the tines having been broken off of the backbone during bending. The overall result is a highly flexible weatherseal 36 without compromising structural integrity. Therefore, the weatherseal 36 is particularly well suited for highly curvilinear applications such as when fitted, for example, to luggage compartments, engine compartments, and door openings.

The illustrated core insert 10 is preferably produced by first slitting a flat metal blank 12 as shown in FIG. 1 and described hereinabove. The metal blank 12 is then preferably stretched via double-coining (FIG. 2), resulting in the slits 18, 22 opening up into the slots 18', 22'. This process is advantageous because no portion of the metal blank 12 is wasted. In fact, because the metal blank 12 is stretched, more longitudinal length is available after the stretching process than before the stretching process. Preferably, double-coining as described herein results in at least 5, preferably at least 10, preferably at least 15, percent length increase compared to the starting metal blank 12.

It is noted that the core metal insert can be produced in a number of other ways within the scope of the present invention. For example, the slots 18' and 22' can be cut or stamped-out by means of a press.

Although particular embodiments of the invention have been described in detail, it will be understood that the invention is not limited correspondingly in scope, but includes all changes and modifications coming within the spirit and terms of the appended claims.

What is claimed is:

1. A core metal insert for a weatherseal, the insert comprising opposed and longitudinally extending first and second edges, a longitudinally extending backbone strip spaced apart from said first and said second edges, said backbone strip having a first face, a second face, a first backbone edge, and a second backbone edge, a plurality of longitudinally spaced apart first slots transversely extending from said first edge to said first backbone edge, and a plurality of longitudinally spaced apart second slots transversely extending from said second edge to said second backbone edge, wherein said backbone strip is compressed to provide opposing first and second grooves respectively along said first and said second faces thereof.

2. A core metal insert according to claim 1, said backbone strip being double-coined to provide said first and said second grooves.

3. A core metal insert according to claim 1, further comprising a plurality of score marks provided on at least one of said first and said second faces of said backbone strip, at least one of said score marks extending transversely along the respective face of said backbone strip between associated first and second slots of said core metal insert.

4. A core metal insert according to claim 3, wherein said score marks are provided on each of said first and said second faces of said backbone strip.

5. A core metal insert according to claim 3, said score marks having a depth of 8–12 percent the thickness of said backbone strip.

6. A core metal insert according to claim 1, said insert comprising a material selected from the group consisting of coated steel, electrogalvanized steel, mild steel, stainless steel, aluminum, and alloys thereof.

7. A core metal insert according to claim 1, said backbone strip having a thickness of 0.1–0.5 millimeters.

8. A core metal insert according to claim 1, further comprising a plurality of first tines and a plurality of second tines, said first and said second tines extending from said backbone strip and defining said first and said second slots between adjacent ones of said first and said second tines respectively, said first and said second tines being bent such that said core metal insert has a U-channel shaped cross-section.

9. A core metal insert according to claim 8, wherein said first and said second tines are substantially intact.

10. A core metal insert for a weatherseal, the insert comprising opposed and longitudinally extending first and second edges, a longitudinally extending backbone strip spaced apart from said first and said second edges, said backbone strip having a first face, a second face, a first backbone edge, and a second backbone edge, a plurality of longitudinally spaced apart first slots transversely extending from said first edge to said first backbone edge, a plurality of longitudinally spaced apart second slots transversely extending from said second edge to said second backbone edge, and a plurality of score marks provided on each of said first and said second faces of said backbone strip, at least one of said score marks extending transversely along the respective face of said backbone strip between associated first and second slots of said core metal insert.

11. A core metal insert according to claim 10, said score marks having a depth of 8–12 percent the thickness of said backbone strip.

12. A core metal insert according to claim 10, said backbone strip being double-coined to provide opposing first and second grooves respectively along said first and said second faces of said backbone strip.

13. A core metal insert according to claim 10, said insert comprising a material selected from the group consisting of coated steel, electrogalvanized steel, mild steel, stainless steel, aluminum, and alloys thereof.

14. A core metal insert according to claim 10, said backbone strip having a thickness of 0.1–0.5 millimeters.

15. A core metal insert according to claim 10, further comprising a plurality of first tines and a plurality of second tines, said first and said second tines extending from said backbone strip and defining said first and said second slots between adjacent ones of said first and said second tines respectively, said first and said second tines being bent such that said core metal insert has a U-channel shaped cross-section.

16. A core metal insert according to claim 15, wherein said first and said second tines are substantially intact.

17. A weatherseal comprising a core metal insert embedded within an outer layer of coating material, said core metal insert comprising opposed and longitudinally extending first and second edges, a longitudinally extending backbone strip spaced apart from said first and said second edges, said backbone strip having a first face, a second face, a first backbone edge, and a second backbone edge, a plurality of longitudinally spaced apart first slots transversely extending from said first edge to said first backbone edge, and a plurality of longitudinally spaced apart second slots transversely extending from said second edge to said second backbone edge, wherein said backbone strip is compressed to provide opposing first and second grooves respectively along said first and said second faces thereof.

18. A weatherseal according to claim 17, further comprising a plurality of first tines and a plurality of second tines, said first and said second tines extending from said backbone strip and defining said first and said second slots between adjacent ones of said first and said second tines respectively, said first and said second tines being bent such that said core metal insert has a U-channel shaped cross-section.

19. A weatherseal according to claim 17, said backbone strip having a plurality of score marks provided on at least one of said first and said second faces of said backbone strip, at least one of said score marks extending transversely along the respective face of said backbone strip between associated first and second slots of said core metal insert.

20. A weatherseal according to claim 19, wherein said backbone strip is severed along said score marks to provide a plurality of discrete structural staples within said weatherseal.

21. A method of making a core metal insert for a weatherseal, the method comprising the steps of:
(a) providing a flat metal blank having a first longitudinally extending edge and a second longitudinally extending edge;
(b) slitting said flat metal blank to provide a plurality of first slits extending transversely from said first edge, and a plurality of second slits extending transversely from said second edge, such that said first and said second slits define a longitudinally extending unslit backbone strip located between and spaced apart from said first and said second edges of said flat metal blank; and
(c) double-coining said backbone strip to provide opposing first and second grooves along opposite faces thereof, said backbone strip being thinned relative to said flat metal blank, and said flat metal blank being stretched to form said core metal insert, the insert having first and second tines extending from opposite edges of said backbone strip.

22. A method according to claim 21, further comprising bending said first and said second tines to provide a U-channel shaped cross-section to said core metal insert.

23. A method according to claim 21, further comprising extruding a coating material over said core metal insert to provide a weatherseal.

24. A method according to claim 23, further comprising providing a plurality of score marks on at least one face of said backbone strip, said score marks extending transversely along said face of said backbone strip between associated first and second slots defined respectively between adjacent ones of said first and said second tines of said core metal insert, and passing said weatherseal over a series of rollers to effectively sever said backbone strip along said score marks, thereby providing discrete structural staples within said weatherseal.

25. A method according to claim 24, wherein said score marks are provided on both a first and a second face of said backbone strip.

26. A method according to claim 24, wherein at least 90 percent of said staples are completely detached from adjacent staples in said core metal insert.

27. A method according to claim 21, further comprising providing a plurality of score marks on at least one face of said backbone strip, said score marks extending transversely along said face of said backbone strip between associated first and second slots defined respectively between adjacent ones of said first and said second tines of said core metal insert.

28. A method according to claim 27, wherein said score marks are provided on both a first and a second face of said backbone strip.

29. A method according to claim 27, further comprising severing said backbone strip along said score marks, thereby providing discrete structural staples within said weatherseal.

30. A method according to claim 21, wherein said flat metal blank is stretched at least 5 percent in length to form said core metal insert.

31. A weatherseal comprising a core metal insert embedded within an outer layer of coating material, said core metal insert comprising a series of structural elements wherein at least 90 percent of said structural elements are individual, discrete structural elements that are completely detached from adjacent ones of said structural elements, each of said structural elements comprising opposing first and second grooves disposed on opposite faces of said element, wherein said first and second grooves extend longitudinally relative to said core metal insert.

32. A weatherseal according to claim 31, wherein substantially no groupings of multiple attached ones of said structural elements are present in said weatherseal.

33. A weatherseal according to claim 31, said series of discrete structural elements being made by severing a longitudinally extending backbone strip of said core metal insert along a series of score marks provided in said backbone strip and extending transversely thereof.

34. A weatherseal according to claim 31, said structural elements being structural staples.

* * * * *

UNITED STATES PATENT AND TRADEMARK OFFICE
CERTIFICATE OF CORRECTION

PATENT NO. : 6,889,985 B2
DATED : May 11, 2005
INVENTOR(S) : Bonds

It is certified that error appears in the above-identified patent and that said Letters Patent is hereby corrected as shown below:

Column 6,
Line 3, after "first and second", please insert -- tines --.

Signed and Sealed this

Nineteenth Day of July, 2005

JON W. DUDAS
*Director of the United States Patent and Trademark Office*